US007324161B2

(12) United States Patent
Hwang

(10) Patent No.: US 7,324,161 B2
(45) Date of Patent: Jan. 29, 2008

(54) DISPLAY APPARATUS AND CONTROL METHOD THEREOF

(75) Inventor: Soon-hoon Hwang, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 509 days.

(21) Appl. No.: 10/793,885

(22) Filed: Mar. 8, 2004

(65) Prior Publication Data

US 2005/0001934 A1  Jan. 6, 2005

(30) Foreign Application Priority Data

Jul. 3, 2003  (KR) ............... 10-2003-0044900

(51) Int. Cl.
 *H04N 5/50* (2006.01)
 *H04N 5/445* (2006.01)
 *H04N 5/45* (2006.01)

(52) U.S. Cl. .............. 348/569; 348/565; 348/567; 348/568

(58) Field of Classification Search ............ 348/569, 348/563, 564, 565, 567, 568; 725/40, 43; *H04N 5/445, H04N 5/50, 5/45*
See application file for complete search history.

(56) References Cited

U.S. PATENT DOCUMENTS

| 5,796,945 | A * | 8/1998 | Tarabella ............... 709/219 |
| 6,216,141 | B1 | 4/2001 | Straub et al. |
| 6,424,791 | B1 | 7/2002 | Saib |
| 7,119,848 | B2 * | 10/2006 | Smith et al. ............... 348/564 |
| 2002/0188959 | A1 | 12/2002 | Piotrowski |
| 2003/0011638 | A1 | 1/2003 | Chung |

FOREIGN PATENT DOCUMENTS

| CN | 1042283 | 5/1990 |
| CN | 1291404 | 4/2001 |
| JP | 04-259175 | 9/1992 |
| JP | 7-162779 | 6/1995 |
| JP | 2002-120444 | 4/2002 |
| JP | 2002-175114 | 6/2002 |
| WO | WO 02-067581 | 8/2002 |

OTHER PUBLICATIONS

The First Office Action dated Jan. 5, 2007 issued by the State Intellectual Property Office of People's Republic of China in the corresponding Chinese Application No. 200410049202.1 (12 pages); The Details of First Office Action (14 pages of English translation).
Office Action issued by the Japanese Patent Office on May 29, 2007 in the corresponding Japanese Application No. 2004-101109 (3 pages).

* cited by examiner

*Primary Examiner*—Sherrie Hsia
(74) *Attorney, Agent, or Firm*—Staas & Halsey LLP

(57) ABSTRACT

A display apparatus having a display main body including a screen and a rear cover formed with an accommodation space between the screen and the rear cover, and a supporting part supporting the display main body, further comprising: a display processor receiving data pertaining to a display and displaying the received data on the screen; an input unit specifying a popup time of a popup window including an executer performing functions requested by a user; a timer measuring a time to notify the popup time specified by and transferred from the input unit; and a controller controlling the display processor to display the popup window on the screen upon receiving the signal notifying the popup time by the timer.

16 Claims, 6 Drawing Sheets

FIG. 2A

|  | PIP | | |
|---|---|---|---|
| Input | PIP | :off | ▶ |
| Picture | Source | :TV | ▶ |
| | Swap | | ▶ |
| Sound | Size | | ▶ |
| | Position | :Opaque | ▶ |
| Channel | Transparency | | ▶ |
| Setup | Popup Timer | | ▶ |

FIG. 2B

| | PIP Popup Timer | | | |
|---|---|---|---|---|
| Input | Set PIP Popup time | | | |
| Picture | Hour | Min | am/pm | Activated |
| Sound | 12 | 3 | am | Yes |
| Channel | | | | |
| Setup | | | | |

DISPLAY APPARATUS AND CONTROL METHOD THEREOF

CROSS-REFERENCE TO RELATED APPLICATIONS

This application claims the benefit of Korean Patent Application No. 2003-044900, filed Jul. 3, 2003, in the Korean Intellectual Property Office, the disclosure of which is incorporated herein by reference.

BACKGROUND OF THE INVENTION

1. Field of the Invention

The present invention relates to a display apparatus and a control method thereof, and more particularly, to a display apparatus and a control method thereof popping up an OSD (On-Screen Display), to perform a specific function requested by a user and at a specific time requested by the user.

2. Description of the Related Art

An OSD is a function of a monitor displaying information that a user requires and/or desires, and generally refers to an on-screen control and a displaying of various settings used in adjusting the monitor.

Generally, a user has to manipulate the OSD to set up the monitor. As an example, with a display device having a PIP (Picture-In-Picture) function, the user has to execute the PIP mode manually at a certain time to display a specific TV program on the same display device being used for word processing.

SUMMARY OF THE INVENTION

Accordingly, it is an aspect of the present invention to provide a display apparatus and a control method thereof popping up an OSD, to perform a specific function requested by a user and at a specific time requested by the user.

The foregoing and/or other aspects of the present invention are achieved by a display apparatus having a display main body including a screen and a rear cover formed with an accommodation space between the screen and the rear cover, and a support supporting the display main body. The display apparatus also includes a display processor receiving data pertaining to a display and displaying the received data on the screen. An input unit specifies a popup time of a popup window and includes an executer performing functions requested by a user. The apparatus also includes a timer measuring a time notify for notification of the popup time specified by, and transferred from, the input unit. A controller controls the display processor so as to display the popup window on the screen upon receiving a signal notifying that the popup time has occurred.

According to an aspect of the invention, the executer is a PIP executer displaying a program specified by the user on a part of the screen.

According to an aspect of the invention, the input unit specifies PIP execution variables. The display apparatus further comprises a memory storing the PIP execution variables transferred from the input unit. The controller controls the display processor to display a PIP on the screen according to the PIP execution variables stored in the memory when the user chooses the PIP executer.

According to an aspect of the invention, the popup window further comprises a full screen executer enabling the program specified by the user to appear on the entire screen. The controller controls the display processor so as to display the program specified by the user on the entire screen when the user chooses the entire screen executer.

According to an aspect of the invention, the popup window further includes an entire screen executer, to enable the program specified by the user to appear on the entire screen. The controller controls the display processor, to display the program specified by the user on the entire screen when the user chooses the entire screen executer.

According to an aspect of the invention, the PIP execution variables include variables pertaining to a position of the PIP, a size of the PIP, and a transparency of the PIP.

According to an aspect of the invention, the PIP execution variables also include an on/off status of the PIP.

According to another aspect of the present invention, a control method of a display apparatus having a display main body including a screen and a rear cover formed with an accommodation space between the screen and the rear cover, and a support supporting the display main body is provided specifying a popup time of a popup window including an executer performing a function requested by a user. The method further includes measuring a time, determining if the measured time matches the specified popup time, and displaying the popup window if the measured time matches the specified popup time.

According to an aspect of the invention, the executer is a PIP executer, to display a program specified by the user on a part of the screen.

According to an aspect of the invention, the control method of the display apparatus further includes specifying PIP execution variables after specifying the popup time, storing the specified PIP execution variables, and displaying the PIP on the screen according to the stored PIP execution variables when the user chooses the PIP executer.

According to an aspect of the invention, the popup window further includes a full screen executer enabling the program specified by the user to appear on the entire screen, and wherein the control method of the display apparatus further includes displaying the program specified by the user on the entire screen when the user chooses the entire screen executer.

According to an aspect of the invention, the PIP execution variables include variables pertaining to a position of the PIP, a size of the PIP, and a transparency of the PIP.

According to an aspect of the invention, the PIP execution variables include an on/off status of the PIP.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent, and more readily appreciated, from the following description of the embodiments, taken in conjunction with the accompany drawings of which:

FIG. 2A is a setting screen of a PIP including a menu item for setting a timer in FIG. 1;

FIG. 2B is a setting screen for a popup time of an OSD from the menu item of a popup timer in FIG. 2A;

DETAILED DESCRIPTION OF THE PREFERRED EMBODIMENTS

Figure 1:
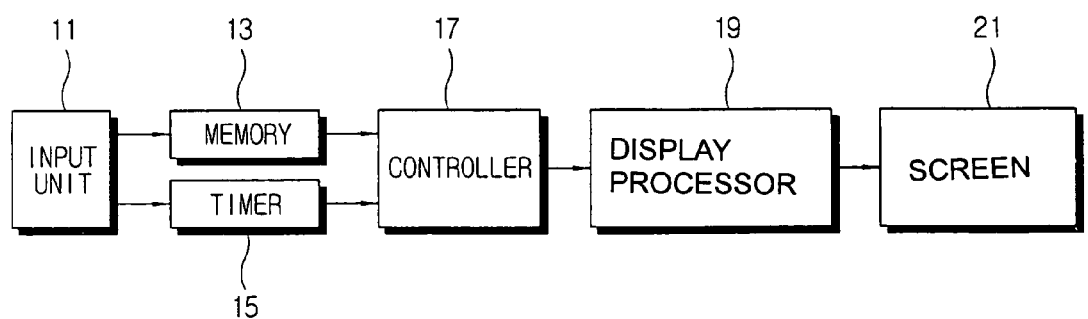
FIG. 1 is a control block diagram of a display apparatus according to an aspect of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

As illustrated in FIG. 1, an aspect of the present invention includes an input unit 11, a timer 15, a controller 17, a display processor 19, and a screen 21.

The input unit 11 receives a time inputted by a user, and transmits the inputted time to the timer 15 to be used as a popup time by a popup window including an executer performing a function requested by the user.

The timer 15 measures a current time, and transmits a signal corresponding to the popup time to the controller 17, upon the measured current time matching the popup time that was transmitted from the input unit 11.

The controller 17 receives the signal notification of the popup time from the timer 15, and transmits a signal pertaining to the popup window to the display processor 19.

Upon receiving the signal containing information about displaying, the display processor 19 displays the popup window on the screen 21, wherein the popup window includes an executer performing functions requested by the user.

Upon the user wanting a PIP mode, the user sets the popup time to make the popup window, including a PIP executer, appear on the screen 21 at the time requested by the user.

The PIP mode displays a small video window superimposed on a full-screen video display, to enable the user to view screens of two different input signals at the same time. As an example, the PIP mode is used in a TV to display two channels on one screen at the same time. Also, the PIP mode is used in a monitor to simultaneously display screens from various sources such as the TV, the video device, and the PC. For example, a full-screen display from an analog or digital PC is displayed while a partial-screen display from another video source such as a TV signal, a composite video signal, an S-Video signal, or a component video signal is simultaneously displayed. Alternatively, the partial-screen display is from the PC and the full-screen display from the other video source.

As illustrated in FIG. 2A, the user sets PIP execution variables with the input unit 11 to execute the PIP mode. The PIP execution variables include an on/off status of the PIP, a size of the PIP, a position of the PIP, and a transparency of the PIP.

The on/off status of the PIP represents whether the PIP mode is on or off, and the size of the PIP and the position of the PIP represent a size and a position of the partial-screen window appearing on the full-screen display, respectively. The transparency setting of the PIP represents a degree the partial-screen window conceals a part of the full-screen display, that is whether the partial-screen window appears transparent over the full-screen display or opaque. Additionally, the PIP execution variables specified by the user are stored in a memory 13.

As illustrated in FIG. 2B, the user sets the popup time to enable the popup window, including the PIP executer, to appear on the screen 21 at the time specified by the user.

Buttons such as an am/pm button, an Hour button, and a Min button represent an exact time when the popup window appears on the screen 21, representing an ante meridiem/post meridiem, an hour, and a minute, respectively.

Figure 2C:
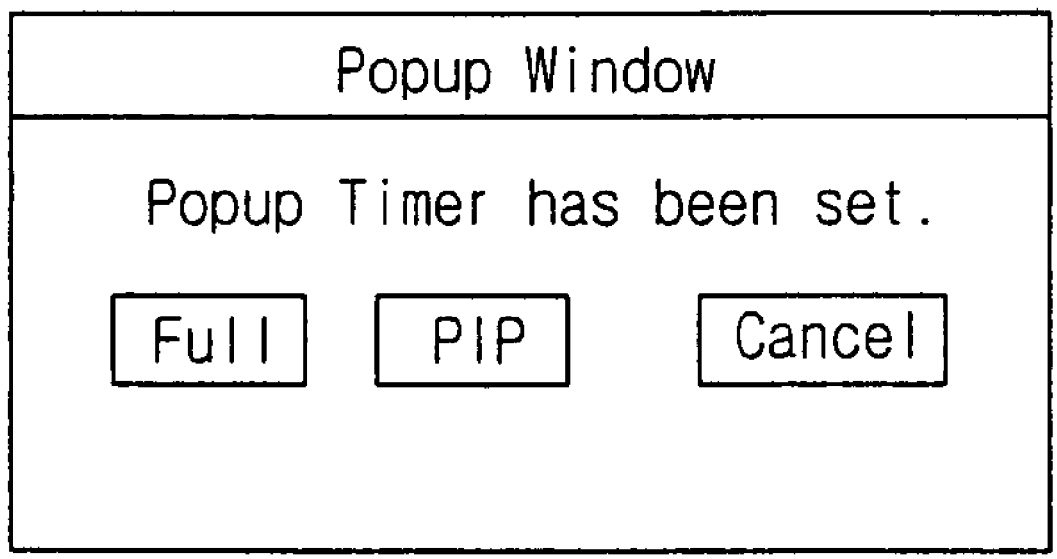
FIG. 2C is a popup window of the OSD appearing at the popup time set from the setting screen in FIG. 2B.

Also, as illustrated in FIG. 2C, the popup window, including the PIP executer and a full-screen executer, appear on the screen 21 at the specified time upon the user setting the popup time.

A PIP button represents the PIP executer. Upon the user choosing the PIP button, the controller 17 controls the display processor 19 to display the PIP on the screen 21 according to values of the PIP execution variables stored in the memory 13.

A Full button represents the full-screen executer. Upon the user choosing the Full button, the controller 17 controls the display processor 19 so as to display a program that the user specifies on the entire screen 21.

Also, a Cancel button represents a cancellation of an execution of the PIP mode.

Figure 3:
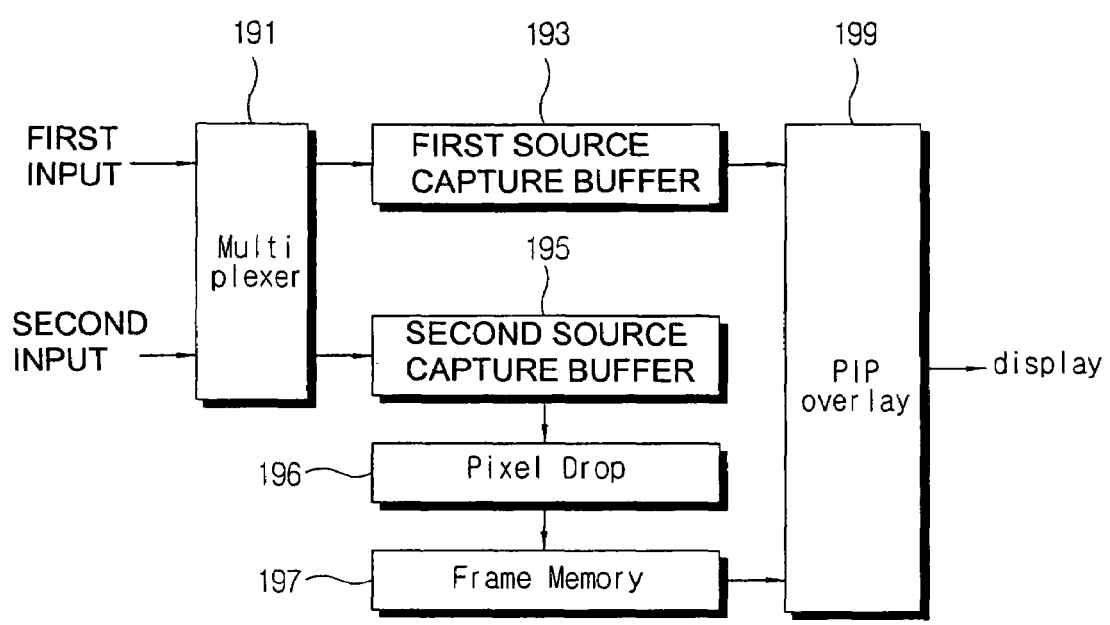
FIG. 3 is a control block of a display controller according to an aspect of the present invention.

As shown in FIG. 3, the PIP mode is performed by the display processor 19.

The display controller 19 includes a multiplexer 191, a first source capture buffer 193, a second source capture buffer 195, a pixel dropper 196, a frame memory 197, and an PIP overlay 199.

The multiplexer 191 receives two input signals and transfers a first input signal to the first source capture buffer 193 as data for a full-screen display on of the screen 21. The multiplexer transfers a second input signal to the second source capture buffer 195 as data for the partial-screen display.

The first source capture buffer 193 captures the first input signal and transfers the captured signal to the PIP overlay 199, while the second source capture buffer 195 captures the second input signal and transfers the captured signal to a pixel reducer 196.

The pixel reducer 196 decreases the number of pixels of data for the second signal to be used for a partial-screen image on the screen 21, and transfers the decreased data to the frame memory 197.

The frame memory 197 storing data for a screen temporarily is a Static Random Access Memory (SRAM). Also, the frame memory 197 transfers the second input signal to the PIP overlay 199 based on the number of clocks used as a basis in transferring the first input signal to the PIP overlay 199.

The PIP overlay 199 mixes the transferred first input signal and the transferred second input signal, and transfers the mixed signal to the screen 21 displaying the PIP.

A control flow according to an aspect of the present invention is described below in reference to FIG. 4.

At operation S11, the user inputs the popup time of the popup window that includes the executer performing functions requested by the user. At operation S13, upon the user choosing the PIP mode, the also specifies the PIP execution variables including the position of the PIP, the size of the PIP, the transparency of the PIP, and the on/off status of the PIP to the input unit 11.

The timer 15 determines a time, at operation S15.

Upon the determined time matching the popup time, the timer 15 transfers a signal notifying the matching of the popup time to the controller 17. Accordingly, at operation S23, the display processor 19, controlled by the controller 17, displays the popup window, including the executer performing the functions requested by the user, on the screen 21.

The popup window is provided with the PIP executer and the full screen executer when the user wants the PIP mode. Upon the user choosing the PIP mode at operation S31, the PIP appears on the screen 21 from the display processor 19 controlled by the controller 17, at operation S37. Upon the user choosing the full-screen mode at operation S33, a program specified by the user appears on the screen 21 from the display processor 19 controlled by the controller 17, at operation S39. Additionally, at operation S35, the user may cancel an execution of the PIP mode.

According to another aspect of the present invention two pictures are displayed side by side as a PBP (Picture-by-Picture) without being superimposed, and/or including other functions determined by the user.

Figure 4:
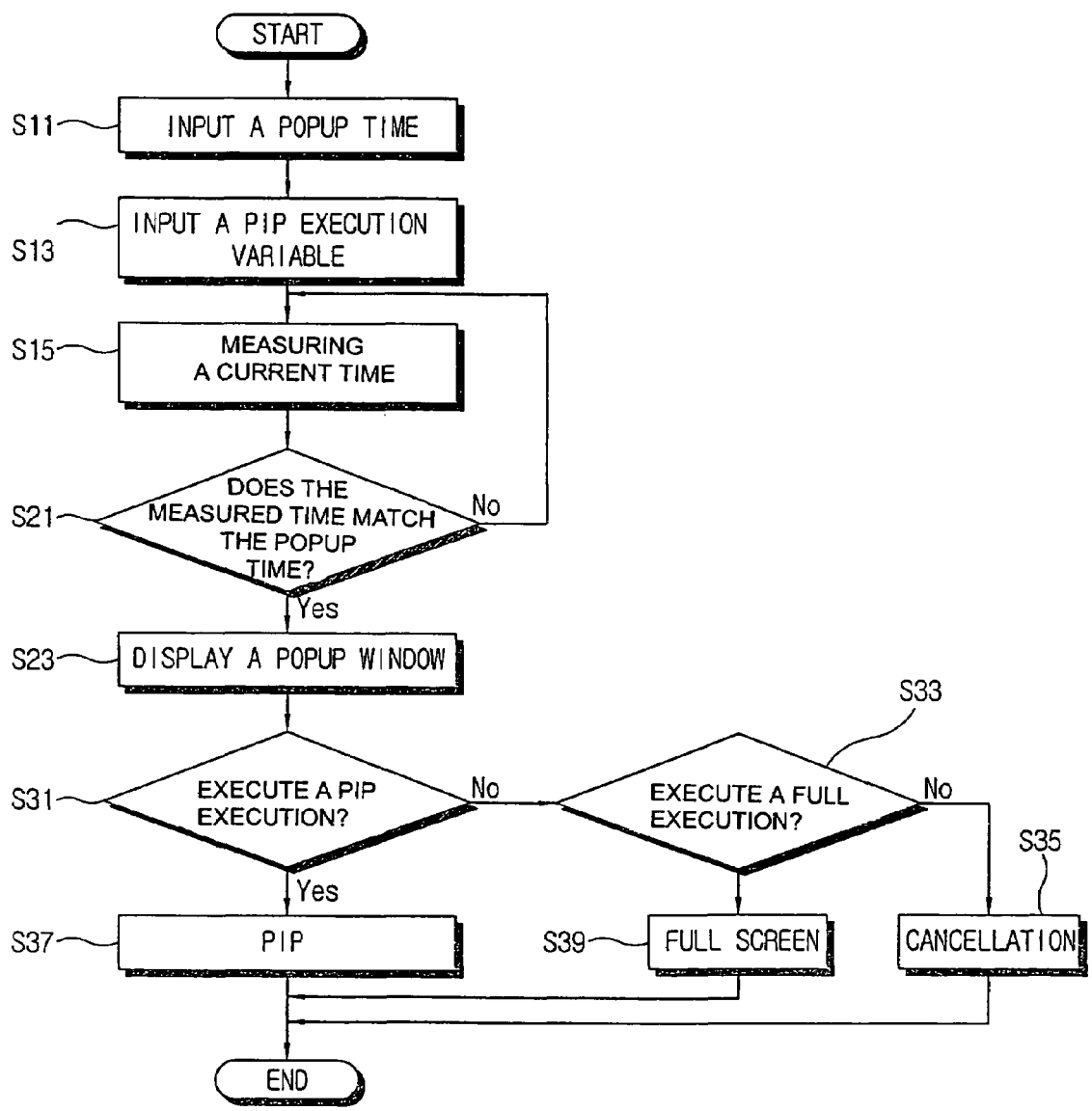
FIG. 4 is a control flow chart of the display apparatus in FIG. 1.

According to other aspects of the invention, the controller, or other unit of the display apparatus, is a computer implementing the method shown in FIG. 4 using data encoded on a computer-readable medium As described above, aspects of the present invention provides a display apparatus and the control method thereof execute a specific function requested by a user at a specific time requested by the user.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A display apparatus having a screen, comprising:
a display processor receiving data pertaining to a display and displaying the received data on the screen;
an input unit specifying a popup time of a popup window that includes an executer, to perform functions requested by a user;
a timer measuring a time, to output a notification signal indicating the measured time matches the specified popup time; and
a controller controlling the display processor, to display the popup window on the screen upon receiving the notification signal,
wherein the display processor comprises a multiplexer inputting a first signal and a second signal, a first source capture buffer receiving data from the multiplexer corresponding to the first signal for a full-screen display, a second source capture buffer receiving data from the multiplexer corresponding to the second signal for a partial screen display, a PIP overlay receiving data from the first source capture buffer, a pixel reducer receiving data from the second source capture buffer and decreasing a number of pixels of the received data, to appear on a partial screen, and a frame memory receiving the decreased data from the pixel reducer.

2. The display apparatus according to claim 1, wherein the executer is a Picture-in-Picture (PIP) executer displaying a program specified by the user on a section of the screen.

3. The display apparatus according to claim 2, wherein the display apparatus further comprises a memory storing the PIP execution variables specified and transferred from the input unit,
wherein the controller controls the display processor to display a PIP on the screen, according to the PIP execution variables stored in the memory, upon the user choosing the PIP executer.

4. The display apparatus according to claim 3, wherein the popup window comprises a full-screen executer, to enable the program specified by the user to appear on the entire screen, and
wherein the controller controls the display processor to display the program specified by the user on the entire screen when the user chooses the full-screen executer.

5. The display apparatus according to claim 3, wherein the PIP execution variables include variables pertaining to at least one of a position of the PIP, a size of the PIP, and a transparency of the PIP.

6. The display apparatus according to claim 3, wherein the PIP execution variables include an on/off status of the PIP.

7. The display apparatus according to claim 2, wherein the popup window comprises a full-screen executer, to enable the program specified by the user to appear on the entire screen,
wherein the controller controls the display processor to display the program specified by the user on the entire screen upon the user choosing the full-screen executer.

8. The display apparatus according to claim 1, wherein the frame memory is a Static Random Access Memory (SRAM), to store data temporarily.

9. The display apparatus according to claim 1, wherein the frame memory transfers the second input signal to the PIP overlay based on the number of clocks used as a basis in transferring the first input signal to the PIP overlay.

10. The display apparatus according to claim 1, wherein the executer is a Picture-by-Picture (PBP) executer, to display a program specified by the user on a section of the screen.

11. The display apparatus according to claim 10, wherein the display apparatus further comprises a memory storing PBP execution variables specified and transferred from the input unit,
wherein the controller controls the display processor to display a PBP on the screen, according to the PBP execution variables stored in the memory, upon the user choosing the PBP executer.

12. The display apparatus according to claim 11, wherein the PBP execution variables include variables pertaining to at least one of a size of each section of the PBP, and an on/off status of the PBP.

13. The display apparatus according to claim 10, wherein the popup window comprises a full-screen executer, to enable the program specified by the user to appear on the entire screen,
wherein the controller controls the display processor to display the program specified by the user on the entire screen when the user chooses the full-screen executer.

14. A display apparatus for a popup window, comprising:
a screen, to display the popup window;
an input unit inputting a popup time for the display of the popup window on the screen;
a timer measuring a current time and comparing the current time with the popup time, to output a popup signal upon the compared time being the popup time; and
a controller receiving the popup signal and controlling the display, to display the popup window on the screen,
wherein the controller comprises a multiplexer inputting a first signal and a second signal, a first source capture buffer receiving data from the multiplexer corresponding to the first signal, to display on the screen, and a second source capture buffer receiving data from the multiplexer corresponding to the second signal, to display on the screen.

15. The display apparatus according to claim 14, wherein the controller further comprises a pixel reducer to decrease a number of pixels of data in the data corresponding to the first signal or the second signal.

16. The display apparatus according to claim 14, wherein a signal source for the first signal and the second signal is at least one of a TV signal, a composite video signal, an S-video signal, and a component video signal.

* * * * *